United States Patent
Dragone

[11] Patent Number: 5,920,663
[45] Date of Patent: Jul. 6, 1999

[54] OPTICAL WAVEGUIDE ROUTER WITH CONTROLLED TRANSMISSION CHARACTERISTICS

[75] Inventor: Corrado Dragone, Little Silver, N.J.

[73] Assignee: Lucent Technologies Inc., Murray Hill, N.J.

[21] Appl. No.: 08/998,092

[22] Filed: Dec. 24, 1997

[51] Int. Cl.⁶ .................................................. G02B 6/26
[52] U.S. Cl. ............................................ 385/15; 385/37
[58] Field of Search .................................. 385/11, 28, 29, 385/1, 15, 37, 27, 129, 41, 33; 359/494, 566, 569

[56] References Cited

U.S. PATENT DOCUMENTS

| | | | |
|---|---|---|---|
| 4,885,734 | 12/1989 | Yuzo | 359/569 |
| 4,991,937 | 2/1991 | Urino | 359/494 |
| 4,998,793 | 3/1991 | Henry et al. | 385/1 |
| 5,029,988 | 7/1991 | Urino | 359/494 |
| 5,031,993 | 7/1991 | Asthana et al. | 385/37 |
| 5,625,723 | 4/1997 | Dragone et al. | 385/11 |
| 5,629,991 | 5/1997 | Dragone | 385/11 |

OTHER PUBLICATIONS

Y. Inoue et al. Athermal Silica–based Arrayed Waveguide Grating (AWG) Multiplexer ECOC97 Sep. 22–25, 1997 pp. 33–36.

*Primary Examiner*—Akm E. Ullah

[57] ABSTRACT

An optical waveguide router is provided with a control arrangement that is bonded to the silicon wafer of the router to deform the arms of the grating of the router to change their optical lengths in the same proportion with little strain in the direction normal to that of the waveguide arms to minimize birefringence effects.

22 Claims, 5 Drawing Sheets

OPTICAL WAVEGUIDE ROUTER WITH CONTROLLED TRANSMISSION CHARACTERISTICS

FIELD OF THE INVENTION

This invention relates to optical waveguide grating routers and to the control in such routers of their temperature dependence and of their wavelengths of maximum transmission.

BACKGROUND OF THE INVENTION

An optical waveguide router is an optical device that is supplied with one or more optical signals, typically of different wavelengths, at one or more input ports, and provides these signals at one or more output ports.

Figure 1:
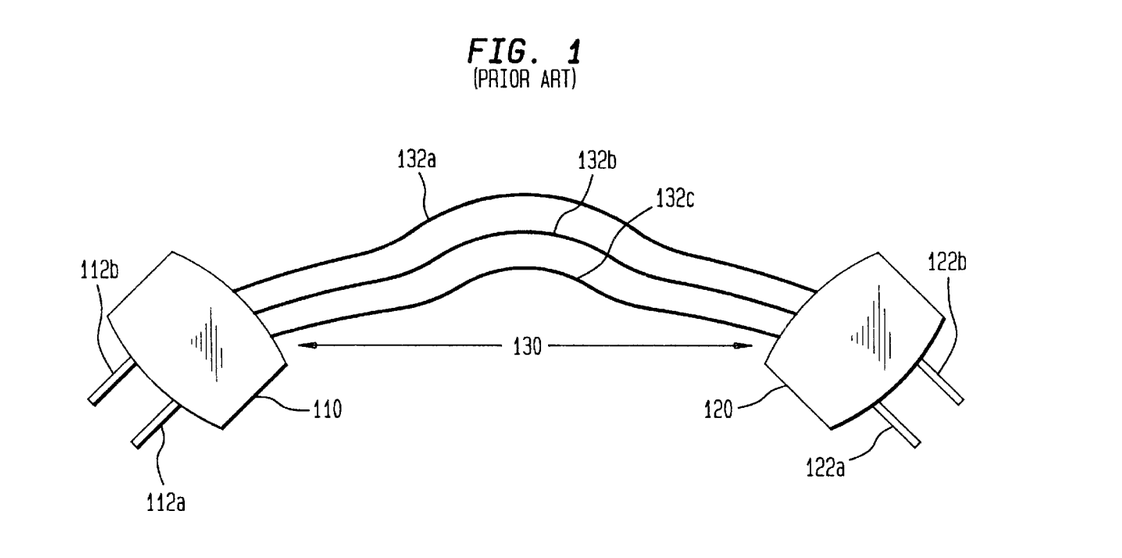
FIG. 1 shows schematically a conventional router of the kind to which the invention is applicable.

As shown in FIG. 1, such a router 100 typically includes an input free-space slab 110, such as a star coupler with one or more input ports 112A, 112B connected thereto, and an output free-space slab 120, also such as a star coupler, with one or more output ports 122A, 122B. An optical grating 130 comprising a succession of optical waveguides 132A, 132B, 132C of different optical lengths, is connected between the input and output free-space slabs. Typically the grating includes at least ten, usually at least twenty and often a hundred or more waveguides. The number is usually dependent on the number of channels, each of a different wavelength, to be routed by the router, in a wavelength-division multiplexed transmission system.

It is known that transmission characteristics of such a router have a temperature dependence, largely as a result of the effect of temperature changes on the lengths and refractive index of the arms of the grating.

My earlier U.S. Pat. No. 5,629,991 that issued on May 13, 1997 relates to techniques for reducing birefringence effects in an optical waveguide router. Birefringence in such routers arises primarily because of the difference in strains in the different materials of the router that are introduced, typically during manufacture. In an optical waveguide of the kind involved, a silica layer which forms the waveguide is supported on a silicon substrate. As a result of the large difference in this thermal expansion coefficients of silica and silicon, large compressive strains are produced in the silica layer as a result of heating steps performed in the fabrication process. The resulting birefringence caused by the strains produces different propagation constants for the TE and TM waveguide modes. Because these two modes have different propagation constants, an optical signal propagating in the router is split into two components corresponding to the TE and TM modes. These components are characterized by different wavelengths of maximum transmission and there is a resulting polarization shift that can reduce efficiency and also increase cross talk between any two channels that are closely spaced in wavelength.

In this prior patent, the polarization shift is reduced by the step of imparting a prescribed curvature to the plane of the optical grating along a line that traverses the successive waveguide arms in a direction substantially perpendicular to that in which the optical signal propagates. The curvature preferably is imparted by flexing the optical grating at two points respectively located near the longest and shortest of the waveguide arms of the grating. The flexing is obtained by a pair of planar elements spaced apart on a common support between which the grating extends.

SUMMARY OF THE INVENTION

The present invention uses a deformation of the grating of the router for the control either of its ambient temperature dependence or of its wavelengths of maximum transmission to be termed its transmission characteristics. In these instances, the deformation is designed to stretch or compress the optical lengths of the grating arms with minimal change either in the planarity of the wafer support or in the dimension in the direction normal to the longitudinal direction of the grating arms. Such changes would give rise to birefringence effects that would produce different propagation constants for the TE and TM waveguide modes with the undesirable consequences mentioned earlier.

In particular, for temperature compensation the deformation of the grating desirably serves to maintain the difference in successive arms of the grating in the same relative proportions despite changes in the ambient temperature.

Such deformation has also proven useful to provide some tuning of the transmission characteristics of the router to correct for departures from the design characteristics or manufacturing aberrations.

For control of temperature dependence, the deformation is done by an arrangement that includes an active element of a material that has a thermal expansion coefficient substantially different from that of the silicon wafer supporting the arms of the grating.

For tuning purposes, the deformation is done by an arrangement that includes an active element whose dimensions can be adjusted by suitable temperature control or an applied voltage such as a piezoelectric element.

In one embodiment, the active element is a plate that is of a material dissimilar to the silicon wafer and that is bonded to the central region of the silicon wafer including the grating. The plate is appropriately shaped to provide a prescribed deformation in the central region that changes the optical lengths of the arms of the grating appropriately when deformed either by temperature changes or applied voltages.

In another embodiment, the control arrangement includes a pair of lever arms that are attached near their pivot point to the silicon wafer outside the central region that includes the grating and an appropriate deformation of the central region is transmitted by changes in length of an active element attached to the opposite ends of the lever arms. As a result, the changes in the length of the control element provides strain effects in the central region between the regions of bonds of the lever arms with the silicon wafers.

The invention will be better understood from the following more detailed description taken in conjunction with the accompanying drawings.

BRIEF DESCRIPTION OF THE DRAWING

FIGS. 6, 7, 8, 9 and 10 are perspective views of the grating portions of other routers in accordance with the invention.

Figure 2:
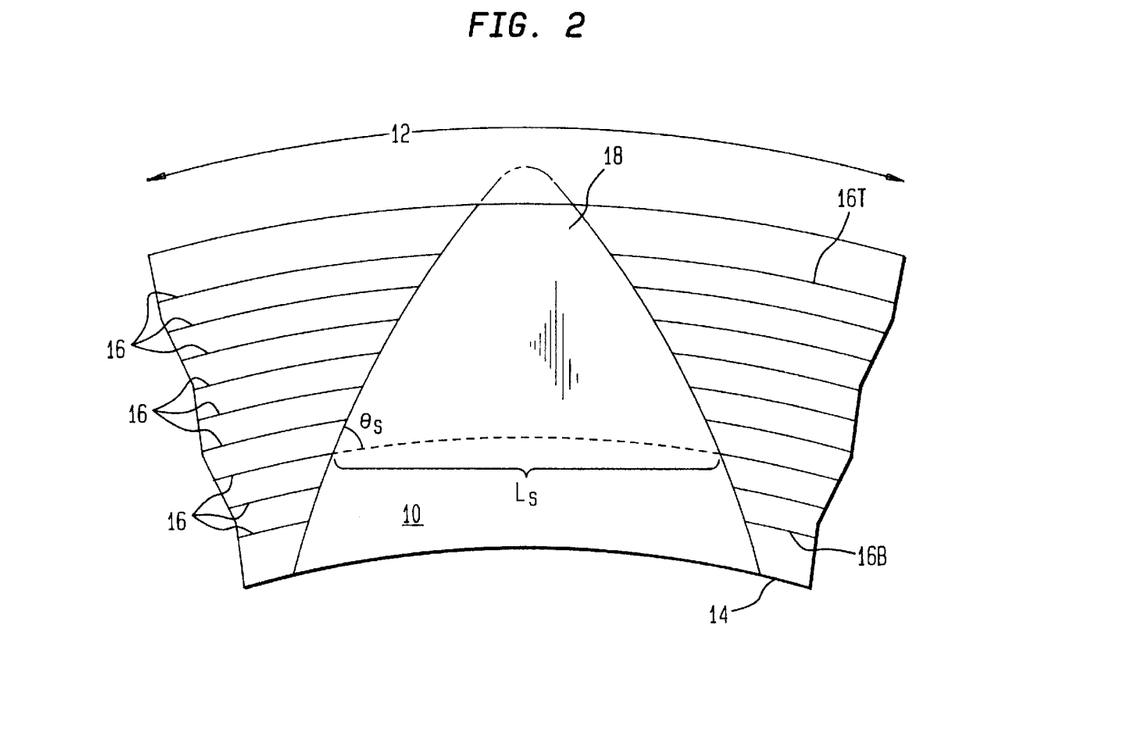
FIG. 2 shows a top view of the grating portion of a router that is provided with temperature compensation in accordance with one illustrative embodiment of the invention.
Figure 3:
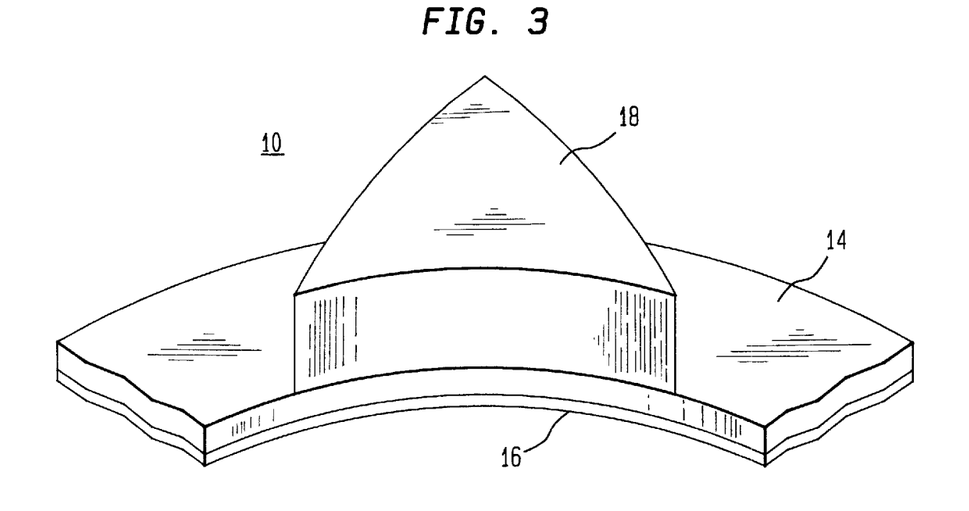
FIG. 3 is a perspective view of the router portion shown in FIG. 2.

With reference now to the drawing, FIG. 2 is a top view of the grating portion of a router 10 over which is positioned a temperature compensating element 18 in accordance with one embodiment of the invention. FIG. 3 is a perspective front view of the same portion.

In particular, as seen in these figures, the router 10 includes a grating portion 12 that comprises a planar silicon wafer 14 on whose top surface is deposited a succession of silica waveguides 16 that form the arms of the grating. Typically, as mentioned earlier, there will be many such arms spaced apart and differing in length by a prescribed amount from one another from the bottom arm 16B in the drawing, which is the shortest, to the top arm 16T, which is the longest. Over the central region of the silicon wafer, preferably on the surface opposite that of the silica waveguides forming the grating arms so as to minimize damage to the silica waveguides, there is bonded an active element 18 of a material, such as aluminum, that has a thermal expansion coefficient substantially different, in the case of aluminum, larger by about a factor of ten, than that of silicon. Accordingly, as the temperature of the ambient increases, the greater expansion in length of the active element 18 will deform the silicon wafer and the silica waveguides formed thereover. The deformation is limited to the region R that corresponds to the bonded area of the active element whose shape is desirably optimized to produce the desired length change with minimum aberration and maximum efficiency. The deformation will produce in the s-th arm a variation proportional to the length $L_s$ that is inside the region R. In this case to minimize aberrations R must be characterized by a constant difference $\Delta L = L_s - L_{s-1}$. For satisfying this condition with the largest $\Delta L$, one finds that the optimum R is an isosceles trapezoid with the non-parallel equal sides slightly curvilinear and the top and bottom sides essentially parallel to the top and bottom arms.

The router advantageously should be deformed primarily only in the longitudinal direction corresponding to the arms, as will be discussed below. Since it is important to remove constraints that would limit such deformation, the grating portion is advantageously separated from the rest of the router by cutting it from the silicon wafer along curved boundaries so that the trapezoid portion can be stretched, without external constraints, along the top and bottom boundaries, as seen in FIG. 3. The grating portion is next attached to the aluminum plate that has a thermal expansion coefficient larger than that of the silicon. The role of the aluminum plate is to induce, in the region R, a temperature dependent deformation that changes the length of the grating arms. To maximize the deformation of the silicon region R, the aluminum plate should be sufficiently thick that its thermal expansion is little affected by the attached silicon.

As a consequence, the strain induced in the silicon is determined essentially only by the difference in the thermal expansion coefficients of the silicon and the aluminum.

By cementing the aluminum plate to the silicon wafer at a temperature T, the strain induced at a different temperature T is approximately $\gamma(T-T_1)$ in the direction parallel to the plane of the silicon wafer, where $\gamma$ is determined by the thermal expansion coefficient of the aluminum. In the direction normal to the paper, a smaller strain component of opposite sign is induced. This will cause some small birefringence that should not be serious. The strains are essentially uniform everywhere in the region R except near its boundaries, whose top and bottom sections advantageously extend beyond the arms of the waveguide. They will change the length $L_s$ of the s-th arm approximately by $\gamma(T-T_1)$. The design of the trapezoid advantageously is such that the change in length $L_s-L_{s-1}$, of two adjacent arms is essentially constant. The optimum trapezoid satisfying these conditions is obtained in the embodiment of FIG. 2 by maximizing the difference $L_M-L_m$, between the maximum and minimum values of the length of the arms and by properly choosing the angles $\theta_s$ between the curved sides of the aluminum plate and the waveguide arms to keep $L_s-L_{s-1}$ constant.

It should be noted that the strain affects both the length and refractive index of the individual arms of the grating. In general strain components orthogonal to the arms cause birefringence resulting in different wavelength shifts for the TE and TM polarizations. To minimize this problem, one should minimize this orthogonal strain component, and additional embodiments to be described later are directed to this end.

Also the deformation of R will produce in the vicinity of its boundaries nonuniform strain. In order to minimize this unwanted strain and at the same time to increase the desired strain component, the silicon wafer should preferably be cut along the curved boundaries of the router to minimize the constraints at the boundaries. If there are not removed wafer regions above and below these boundaries, highly nonuniform strain may result in the vicinity of the edges of the trapezoid that might cause undesirable aberrations and might also reduce the mechanical strength of the arrangement.

Figure 4:
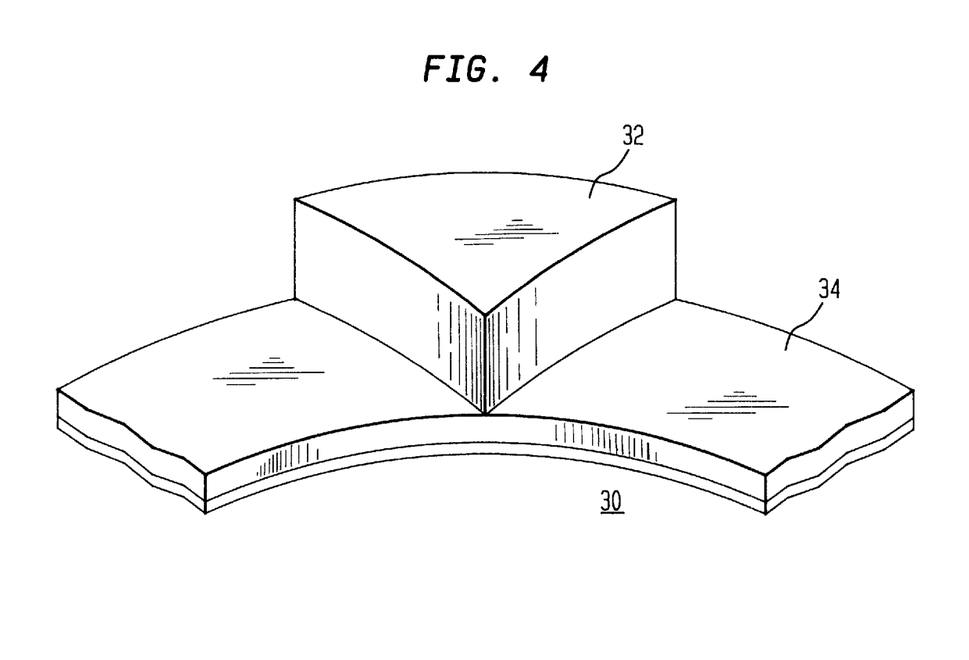
FIG. 4 is a perspective view of the grating portion of a router that is illustrative of an embodiment that has a prescribed temperature dependence.

The arrangement of FIG. 2 is aimed at maintaining the transmission characteristics of the router largely insensitive to temperature changes. In some instances, it may be desirable to have a router that is sensitive in a desired manner to temperature changes. In FIG. 4, there is shown an arrangement for increasing the temperature sensitivity of a router.

The arrangement 30 of FIG. 4, which is designed for realizing a temperature sensitive router, involves rotation by 180° of the active element 32 attached to the silicon wafer 34 that includes the waveguide arms of the grating (not seen), from that used in the temperature insensitive arrangement shown in FIG. 2. The result is a tunable router whose wavelength of maximum transmission can be controlled by controlling the temperature.

Essentially this same result can be achieved by using for the active element 18 in the embodiment of FIG. 3 a plate of a material that has a smaller thermal expansion temperature coefficient than that of the grating.

It should also be appreciated that the desired control of the transmission properties of the router can similarly be obtained by using for the active element a plate of a material that is piezoelectric so that an applied voltage can be used to change its dimension in a desired direction and to use the change to induce a corresponding change in the bonded region R.

It should also be appreciated that some tuning of the transmission properties of the router is often desirable to correct for fabrication non-uniformities after fabrication is complete and before the router is included in an optical network.

For some applications, one would like a router that has specified wavelengths of maximum transmission at a prescribed temperature. Then the control element should be cemented to the silicon wafer at the prescribed temperature corresponding to the specified wavelengths and the control element should be such as to maintain the router insensitive to temperature, as by the arrangement of FIG. 2.

In the design of a router with a prescribed temperature dependence over a given interval $T_m < T < T_M$, the largest temperature range $T_M - T_m$ that can be obtained is limited by the largest strain that is allowed by the mechanical strength of the silicon wafer and its bond to the plate. It is therefore desirable to produce compressive strain, which can then assume large values without causing mechanical failure, as in the arrangement to be described later.

There are several shortcomings in the arrangements of FIGS. 2 and 4. Ideally, we would like to affect the lengths of the waveguides without causing strain components in the directions orthogonal to the waveguides. In the arrangements already described, the control plate that serves as the active element will expand (or contract) in all directions and, since it is directly attached to the wafer, it will produce in the wafer both longitudinal and transverse deformations. The latter deformations are undesirable, for they cause birefringence, and also reduce the mechanical strength of the router, without substantially affecting the lengths of the grating arms. They also induce relatively nonuniform deformations in the vicinity of its boundaries outside the region R covered by the plate. Moreover, since a strong and reliable bond is needed between the control plate and the silicon wafer, it may be necessary to form the bond at a relatively high temperature, thus causing considerable strain at lower temperatures. To lessen this problem, one could of course keep the control plate under compression, during the bonding process, by using a suitable clamping arrangement, to be removed once the plate is properly cemented.

Figure 5:
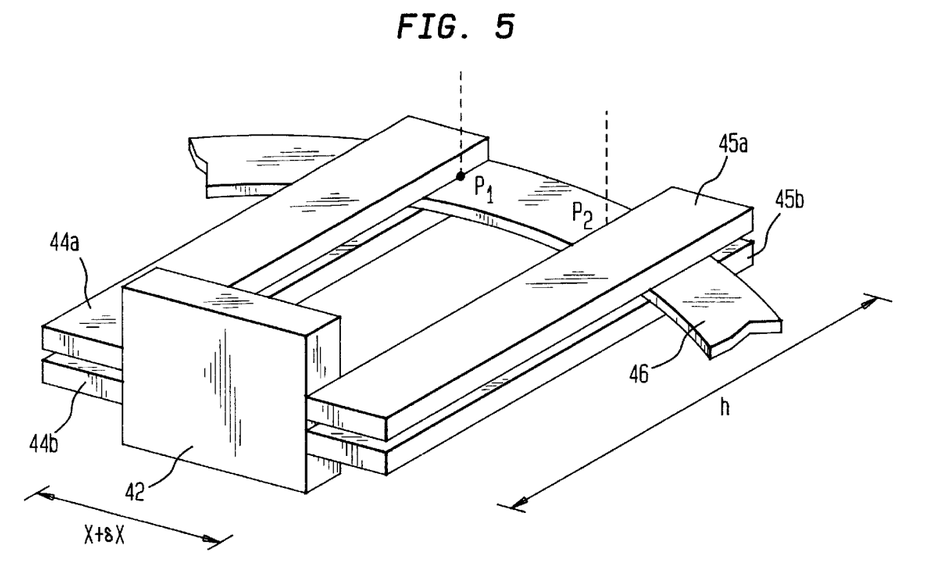
FIG. 5 is a perspective view of the grating portion of a router that is an illustrative embodiment that avoids shortcomings of the embodiments shown in FIGS. 2 and 4.
Figure 6:
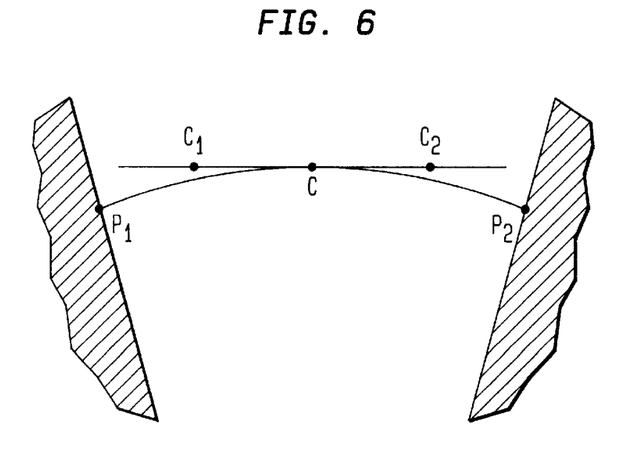
FIG. 6 is a drawing useful in explaining the operation of the embodiment of FIG. 5.

An arrangement 40 that largely avoids the shortcomings of the arrangements of FIGS. 2–4 is shown in FIG. 5. In this arrangement, the active element 42 is positioned between a symmetric arrangement of two pairs of lever arms 44A, 44B and 45A, 45B of a material, such as silicon, that has a thermal expansion coefficient essentially similar to that of silicon.

To a good approximation, the rotation of each pair of lever arms is approximately a rotation around the neutral line location. Any desired location can be produced for the neutral line, by placing for instance the arrangement of FIG. 5 a rigid element between two points $P_1$, $P_2$, so that the neutral line is in the vicinity of these two points. The deformation induced by the active element in the case where its thermal expansion coefficient is different from that of silicon varies linearly with temperature, and it vanishes at the temperature $T_0$ for which the active element does not apply any force to the arms. It is generally desirable to produce, over the entire temperature range of interest, compressive strain in the entire region R between the two lever arms. This can be accomplished by designing the arrangement so that the neutral line is located outside the region R, as shown in the alternative arrangement 60 shown in FIG. 7. In this case the neutral line is outside the region R and, if the temperature $T_0$ is large enough, compressive strain will be induced in region R over the entire temperature range of interest, thus allowing large deformations to be produced without causing mechanical failure. With a piezoelectric active element, the control of applied voltage may be used in a like manner.

Figure 7:
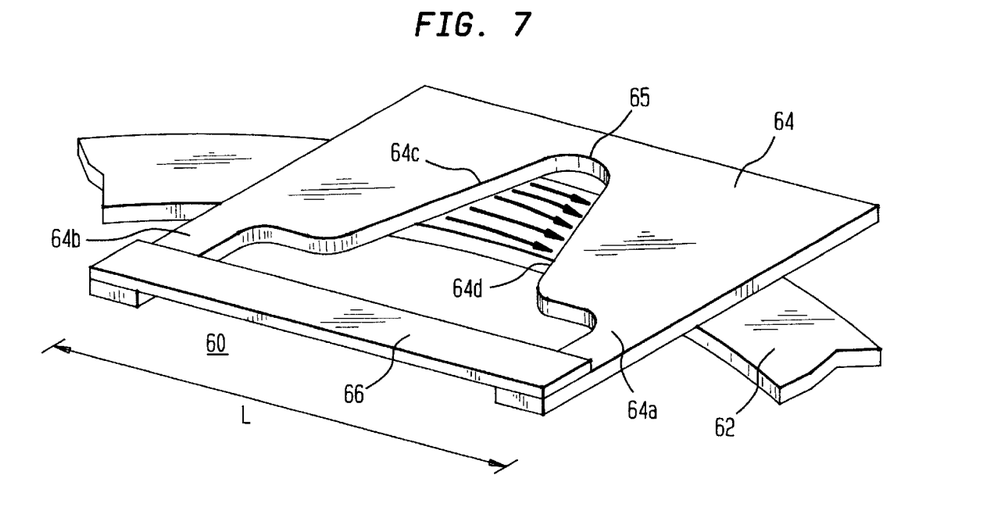

With reference now to the arrangement 60 shown in FIG. 7, the silicon wafer 62 that supports the grating arms is bonded to a plate 64, of silicon or a material with a thermal expansion coefficient similar to that of silicon, that has had cut out of it a V-shaped portion to provide a pair of spaced arms 64A, 64B. The spaced arms 64A, 64B that may be viewed as lever-like arms, are interconnected at their pivot ends by a transverse section 65 that lies outside the region of the silicon wafer. This reduces the longitudinal deformation between the end points of the arms 64A, 64B and forces the neutral line to be located in the vicinity of the end points. At their other ends, the arms 64A, 64B are interconnected by the active element 66, typically a bar of a material different from that of the silicon wafer, either to have a different thermal expansion coefficient or to be piezoelectric, depending on the particular mode of operation desired. In this arrangement, the effect of the change in length of the active element is magnified by the lever-like action of the arms 64A, 64B, permitting a wider choice of materials for the active element. In this arrangement the neutral line described above determined by the center of rotation of the two arms 64A, 64B lies outside the silicon wafer 62, and by properly designing the arrangement one can insure that largely only compressive strain is produced in the silicon wafer in the region between the two arms over a relatively wide range of temperatures. Advantageously, to get the desired uniform rate of change in the successive arms of the grating, the inner edges of the two arms 64C, 64D at the region of their bonding to the wafer should be slightly curved, much as were the outer edges of the isosceles curvilinear trapezoidal control element of FIG. 2.

It is an advantage of this arrangement that the main bonding or cementing to the router is done between like materials. As a result no strains are introduced in the regions of the wafer covered by the arms 64A, 64B. In the region of the wafer between the arms, on the other hand, negligible strain is only induced when the ambient temperature of operation coincides with the temperature at which the bonding or cementing of the active element was done. Accordingly, by appropriate choice of the temperature of the bonding, there can essentially be fixed the characteristics of the arrangement at ambient temperatures.

An important advantage of this arrangement 60 is that the rotation induced by the two arms 64A, 64B can be varied by increasing the length of the active element to get increased leverage.

The length of the active element can be controlled either by temperatures, by making it of a material with a thermal expansion coefficient different from that of the silicon wafer or by an applied voltage of a piezoelectric material whose length can be changed by an applied voltage, in accordance with the principles previously discussed. In particular, by choosing a material of thermal expansion coefficient larger that that of the silicon wafer, temperature compensation can be achieved. By choosing a material that is piezoelectric, an applied voltage can be used to adjust the transmission properties of the router, as for example to fix the wavelengths of maximum transmission, as might be useful to adjust for manufacturing aberrations, as previously discussed.

Figure 8:
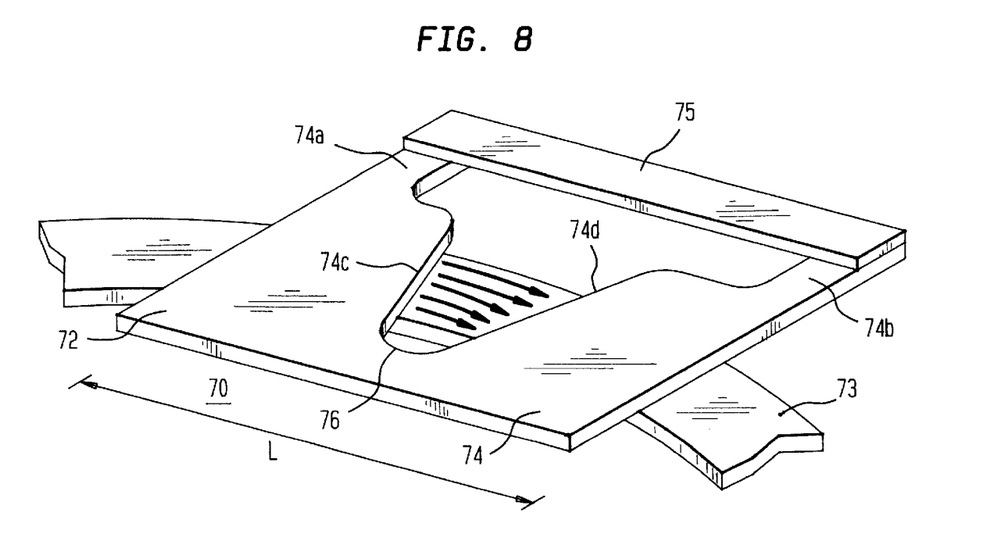

An arrangement that uses an inverted form of control arrangement 70 is shown in FIG. 8. In this arrangement a plate 72, which resembles plate 64 used in the arrangement 60 of FIG. 7, is rotated 180° before being bonded to the silicon 74 so that the lever-like arms 72A, 72B between which is bonded the active element 75 extend beyond the longest arm of the grating 73 and the transverse segment 76 extends beyond the shortest arm of the grating 73. This arrangement can be used for temperature compensation if the active element 75 is of a material, such as silica, whose thermal expansion coefficient is smaller that that of silicon. Alternatively, it can be used for the transmission properties by use of a piezoelectric material for the active element, as previously discussed.

Figure 9:
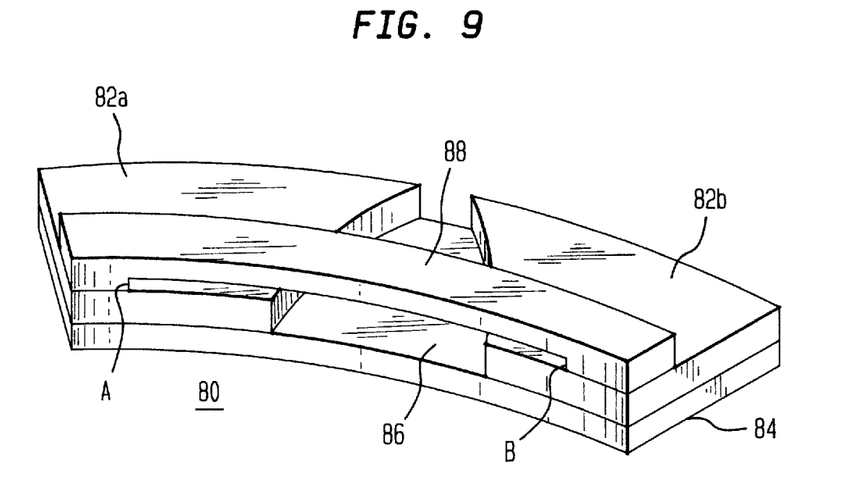

An alternative arrangement 80 for obtaining essentially pure compressive strain in the router grating is shown in FIG. 9. A pair of plates 82A, 82B of silicon or material of like thermal expansion coefficient are bonded to the silicon wafer 84 that supports the router grating (not seen) and shaped to leave exposed therebetween a region 86 that is shaped like an isosceles trapezoid with curvilinear sides. The active element 88 that can be of either of the two kinds that have been described before is connected between widely spaced areas A and B at the far edges of the plates 82A, 82B to get large deformations in the silicon wafer. It may be advantageous firs;t to attach the control element 88 to the two silicon arms 82A, 82B at a temperature $T_2$ and then bond the arms to the silicon wafer 84 at a different temperature $T_0$. Then by appropriately choosing the temperature difference $T_1$–$T_0$ one can achieve the appropriate length change at ambient temperature. In an arrangement such as this, it is advantageous to bond the silicon arms to the surface of the silicon wafer that does not include the waveguide arms to minimize the effect of the bonding on the waveguide arms.

Figure 10:
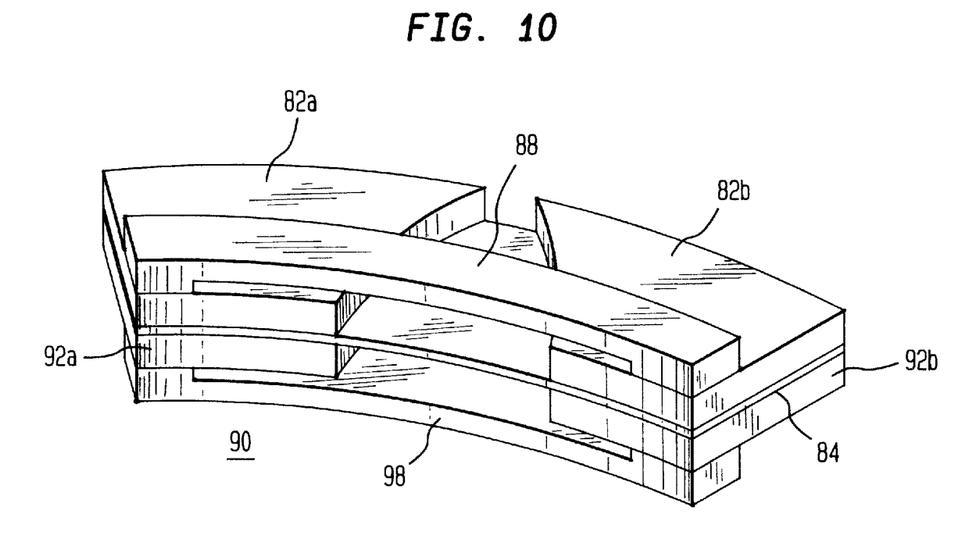

In FIG. 10, there is shown an embodiment 90 that differs from the embodiment 80 shown in FIG. 9 by the addition of a similar control arrangement including plates 92A, 92B and active element 90 on the opposite surface of silicon wafer 86. The resulting symmetry about silicon wafer 86 should minimize any tendency of wafer 86 to bend because of the strain induced therein by the control arrangement.

In similar fashion, each of the arrangements shown in FIGS. 2, 4, 7 and 8 can be modified by adding a symmetric control arrangement on the opposite surface of the silicon wafer. As discussed above, when only one control arrangement is used, it is best to position it on the surface free of the silicon waveguide arms to minimize damage to the waveguide arms.

It should be appreciated that the specific embodiments described are merely illustrative of the general principles of the invention. It is expected that various modifications may be devised by a worker in the art without departing from the spirit and scope of the invention. In particular, it should be obvious that the materials chosen for use in the control means can be other than those specifically mentioned. Similarly considerable variation should be feasible in the shapes of the elements of the control means.

What is claimed:

1. A router for optical waves including a planar member for support of the optical waveguides forming the router, an input free space slab on the planar member including input and output ports, an output free space slab on the planar member having input and output ports, and a grating on the planar member connected between the output ports of the input free space slab and the input ports of the output free space slab including a succession of optical waveguide arms, the optical lengths of successive optical waveguide arms differing by an essentially constant amount, and a control arrangement bonded to the planar member including an active element whose length is variable and whose changes in length are used to provide primarily longitudinal strain in the waveguide arms of the grating to affect their optical length without causing significant birefringence in the grating.

2. A router in accordance with claim 1 in which the active element is of a material whose thermal expansion coefficient is substantially different from that of the planar member whereby changes in the ambient temperature provide strain in the waveguide arms to compensate for the changes in optical lengths of the waveguide arms due to changes in the ambient temperature whereby the transmission characteristics of the router are made less dependent on the ambient temperature.

3. A router in accordance with claim 1 in which the active element is of a piezoelectric material such that an applied voltage applied to it changes its length to strain the waveguide arms to provide a desired change in the transmission characteristics of the router.

4. A router in accordance with claim 1 in which the active element changes the optical lengths of the waveguide arms in substantially the same proportions.

5. A router in accordance with claim 1 in which the control arrangement includes a plate of a material different from that of the planar support member bonded to a surface of the support member at a region that includes the waveguide arms of the grating.

6. A router in accordance with claim 5 in which the plate has the shape of an isosceles trapezoid with curved sides.

7. A router in accordance with claim 1 in which the control arrangement includes a pair of lever-like arms that are of a material whose thermal expansion coefficient is similar to that of the planar support member and that are bonded to the planar support member, and an active element of a material different from that of the planar support member that is bonded between like ends of the pair of lever-like arms.

8. A router in accordance with claim 7 in which the active element is of a material with a thermal expansion coefficient different from that of the pair of lever-like arms and of the planar support member.

9. The router of claim 1 which includes a second control arrangement similar to the first-mentioned control arrangement bonded symmetrically with the first-mentioned control arrangement on the opposite surface of the planar member.

10. The router of claim 9 in which each control arrangement includes a separate pair of lever arms bonded to the planar member on opposite surfaces and an active element bonded to interconnect the pair of waveguide arms but free of bonds to the planar member, the pair of lever arms being of the same material as the planar support member, the active element being of a material different from that of the planar support member.

11. A router for optical waves including an input free space slab having input and output ports, an output free space means having input and output ports, and a grating connected between the output ports of said input free space means and the input ports of said output free space slab and including a plurality of optical waveguide arms of varying lengths characterized in that control means are included for utilizing temperature changes in the ambient for physically deforming in the same proportion the lengths of the optical waveguide arms of the grating to achieve a prescribed temperature dependence for the router.

12. The router of claim 11 in which the control means comprises a plate that is of a material having a thermal temperature coefficient substantially larger than that of the grating in the approximate shape of an isosceles trapezoid and that is bonded to the grating means such that changes in the length of the plate because of changes in the ambient temperature make compensating changes in the lengths of the optical waveguides arms of the grating.

13. The router of claim 12 in which the wider of the non-parallel sides of the trapezoidal plate is bonded near the shortest optical waveguide arm of the grating while the narrower of the non-parallel sides is bonded near to the longest optical wave,guide arm of the grating.

14. The router of claim 12 in which the narrower of the non-parallel sides of the trapezoidal plate is bonded near the longest optical waveguide arm and the wider near the shortest optical waveguide arm.

15. The router of claim 1 in which the router includes a silicon support member and the waveguides are of silica and are bonded to the one surface of the planar support member.

16. The router of claim 15 in which the active element is of aluminum.

17. The router of claim 15 in which the active element is of a piezoelectric material.

18. The router of claim 15 in which the control arrangement includes a pair of lever-like arms of silicon, each of which includes one portion that is bonded to the silicon support member in a region free of the grating and its remaining portion is not bonded to the silicon support member, and the active element is bonded to said remaining portion of each lever-like arm for interconnecting the two lever-like arms.

19. The router of claim 18 in which the active element is of a material with a thermal expansion coefficient different from that of silicon.

20. The router of claim 18 in which the active element is of piezoelectric material.

21. The router of claim 18 in which the portion of the silicon support member supporting the grating has been shaped to conform to the grating.

22. The router of claim 18 in which the lever-like arms are shaped to change the optical lengths of the arms of the grating by essentially the same proportions as the region of the planar support member between the lever-like arms is strained by changes in length of the active element.

* * * * *